United States Patent
Cain et al.

(10) Patent No.: US 9,788,033 B1
(45) Date of Patent: Oct. 10, 2017

(54) SECURE DIFFERENTIAL INSERTION OF SECONDARY CONTENT

(71) Applicant: Cisco Technology, Inc., San Jose, CA (US)

(72) Inventors: Harel Cain, Jerusalem (IL); Michal Devir, Haifa (IL); Yaron Sella, Beit Nekofa (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/196,068

(22) Filed: Jun. 29, 2016

(51) Int. Cl.
*H04N 7/16* (2011.01)
*H04N 21/2543* (2011.01)
(Continued)

(52) U.S. Cl.
CPC ..... *H04N 21/2543* (2013.01); *H04N 21/2541* (2013.01); *H04N 21/42623* (2013.01);
(Continued)

(58) Field of Classification Search
CPC ........... H04N 21/2396; H04N 21/2541; H04N 21/25875; H04N 21/266; H04N 21/26606; H04N 21/26613
See application file for complete search history.

(56) References Cited

U.S. PATENT DOCUMENTS

| | | | |
|---|---|---|---|
| 6,760,382 B1 * | 7/2004 | Mizobata | H04L 12/18 375/144 |
| 7,340,760 B2 | 3/2008 | Wachtfogel et al. | |

(Continued)

FOREIGN PATENT DOCUMENTS

| | | |
|---|---|---|
| EP | 1111924 | 6/2001 |
| EP | 2086230 | 8/2009 |

(Continued)

OTHER PUBLICATIONS

International Search Report and Written Opinion, dated Jul. 27, 2017 cited in a corresponding application (WO application No. PCT/IB12017/053559).

*Primary Examiner* — Randy Flynn
*Assistant Examiner* — Timothy Newlin
(74) *Attorney, Agent, or Firm* — Samuel M. Katz

(57) ABSTRACT

In one embodiment, a consumer device is assigned, at a broadcast headend to one of at least two groups of consumer devices, the two groups including a first group of consumer devices which is required to play content of a second type in order to view content of a first type and a second group of consumer devices which is not required to play content of the second type in order to view content of the first type. A video broadcast stream is sent from the broadcast headend to the consumer device, the video broadcast stream comprising content of the first type sent associated with a first packet ID (PID) and content of the second type sent associated with a second PID, wherein the first PID and the second PID are processed at the consumer device at the same time. An entitlement management message (EMM) is sent from the broadcast headend to the consumer device according to its group of consumer devices, the EMM being of one of a first type of EMM for devices of the first device type and a second type of EMM for devices of the second device type. An entitlement control message (ECM) stream is sent from the broadcast headend to the consumer device, the ECM stream including comprising three types of ECMs: ECM_P_i_start which enables the consumer device to produce a control word which decrypts a first portion of the content of the first type; ECM_A_(i-1) which enables the consumer device to produce a control word which decrypts content of the second type; and ECM_P_i_rest which enables the consumer device to produce a control word which decrypts (Continued)

a second portion of the content of the first type. Related hardware, systems and methods are also described.

20 Claims, 4 Drawing Sheets

(51) Int. Cl.
*H04N 21/845* (2011.01)
*H04N 21/426* (2011.01)
*H04N 21/254* (2011.01)
*H04N 21/4627* (2011.01)
*H04N 21/81* (2011.01)

(52) U.S. Cl.
CPC ....... *H04N 21/4627* (2013.01); *H04N 21/812* (2013.01); *H04N 21/845* (2013.01)

(56) References Cited

U.S. PATENT DOCUMENTS

| | | | |
|---|---|---|---|
| 8,046,787 B2 | 10/2011 | Cerrato | |
| 8,387,086 B2 | 2/2013 | Agarwal et al. | |
| 8,522,357 B2 | 8/2013 | Fahn | |
| 9,288,551 B2 | 3/2016 | Kummer | |
| 2002/0112234 A1* | 8/2002 | Bacon | H04N 7/167 725/25 |
| 2002/0168963 A1* | 11/2002 | Wajs | H04N 7/165 455/411 |
| 2003/0031455 A1 | 2/2003 | Sagar | |
| 2003/0194091 A1* | 10/2003 | Wajs | H04L 9/0833 380/278 |
| 2006/0059508 A1* | 3/2006 | Kamperman | H04N 7/163 725/31 |
| 2006/0123246 A1* | 6/2006 | Vantalon | H04N 5/913 713/189 |
| 2007/0107011 A1 | 5/2007 | Li et al. | |
| 2008/0120708 A1* | 5/2008 | Waisbard | H04N 7/1675 726/6 |
| 2009/0059865 A1* | 3/2009 | Zhang | H04W 36/02 370/331 |
| 2009/0199287 A1* | 8/2009 | Vantalon | G06F 21/10 726/9 |
| 2010/0272257 A1* | 10/2010 | Beals | G06Q 20/1235 380/216 |
| 2010/0332819 A1* | 12/2010 | Guionnet | H04N 7/1675 713/150 |
| 2013/0247089 A1* | 9/2013 | Kummer | H04N 21/4508 725/31 |
| 2016/0036783 A1* | 2/2016 | Penugonda | H04L 63/062 713/168 |

FOREIGN PATENT DOCUMENTS

| | | |
|---|---|---|
| WO | 2005025220 | 3/2005 |
| WO | WO2007/057876 | 5/2007 |

* cited by examiner

SECURE DIFFERENTIAL INSERTION OF SECONDARY CONTENT

TECHNICAL FIELD

The present disclosure generally relates to pay TV systems.

BACKGROUND

Differential pricing of video offerings enables video service providers to offer customers a choice of multiple price levels in return for a service quality that suits how much the customers are willing to pay. In the context of pay TV, differential pricing can allow service providers the option of charging customers in relation to how many secondary content items the customers are willing to watch as part of the programming they consume. For example, the lowest price level may be a free subscription to a service in return for a high frequency of secondary content items, while a mid-level package includes a limited amount of secondary content items, and a most expensive, premium option, may not include any secondary content items at all.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a consumer device is assigned, at a broadcast headend to one of at least two groups of consumer devices, the two groups including a first group of consumer devices which is required to play content of a second type in order to view content of a first type and a second group of consumer devices which is not required to play content of the second type in order to view content of the first type. A video broadcast stream is sent from the broadcast headend to the consumer device, the video broadcast stream comprising content of the first type sent associated with a first packet identifier (PID) and content of the second type sent associated with a second PID, wherein the first PID and the second PID are processed at the consumer device at the same time. An entitlement management message (EMM) is sent from the broadcast headend to the consumer device according to its group of consumer devices, the EMM being of one of a first type of EMM for devices of the first device type and a second type of EMM for devices of the second device type. An entitlement control message (ECM) stream is sent from the broadcast headend to the consumer device, the ECM stream including comprising three types of ECMs: ECM_P_i_start which enables the consumer device to produce a control word which decrypts a first portion of the content of the first type; ECM_A_(i−1) which enables the consumer device to produce a control word which decrypts content of the second type; and ECM_P_i_rest which enables the consumer device to produce a control word which decrypts a second portion of the content of the first type. Related hardware, systems and methods are also described.

Example Embodiments

Figure 1:
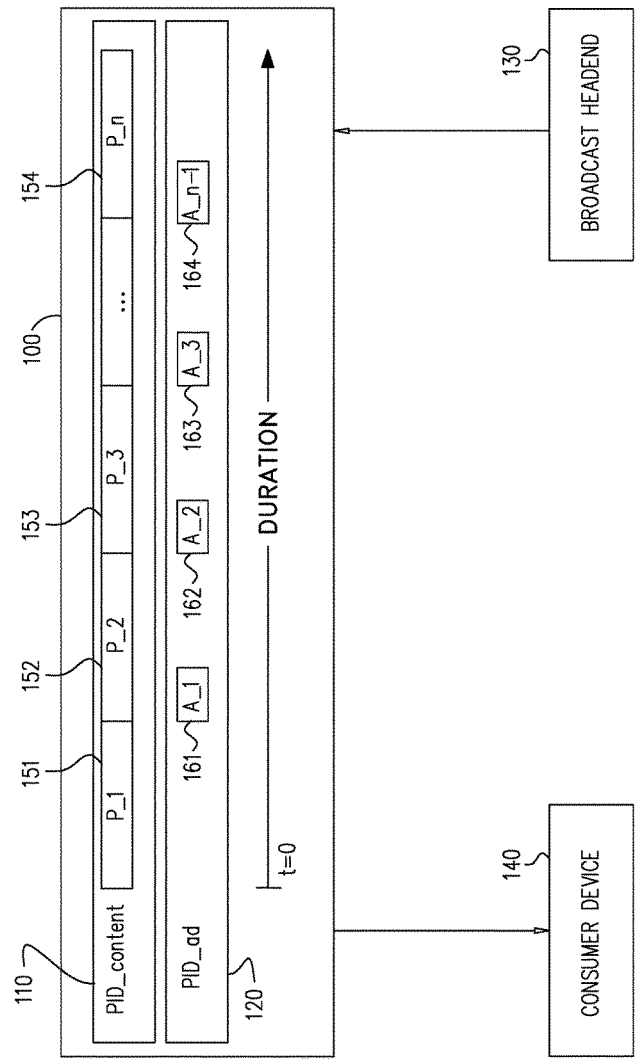
FIG. 1 is a block diagram depiction of a video broadcast stream comprising at least two PIDs, constructed and operative in accordance with an embodiment of the present invention.

Reference is now made to FIG. 1, which is a depiction of a video broadcast stream 100 comprising at least two packet identifiers (PIDs) 110, 120, constructed and operative in accordance with an embodiment of the present invention. The video broadcast stream 100 is broadcast by a broadcast headend 130 to a consumer device 140. The consumer device 140 may comprise a set top box (STB), a digital video recorder (DVR), a desktop or laptop computer, a hand held computing device such as a tablet or smart phone, or any other appropriate consumer device 140 as is known in the art.

A streamed video program, which may be streamed to the consumer device 140 as the video broadcast stream 100, is broken into n content item parts: P_1 151, P_2 152, P_3 153, . . . , P_n 154. The streamed video program may comprise a television event, e.g., a television program or other video content item.

An optional break A_i, such as A_1 161, A_2 162, A_3 163, A_n−1 164, for secondary content, such as an advertisement ("ad"), can be inserted after P_i, for i=1, . . . , n−1. In principle an ad break A_n may be inserted after P_n as well; however, in practice, the likelihood is small that an ad will be displayed in an ad break linked to the final part P_n programming content. The division of the television event or other content item into parts is not arbitrary but rather has to do with the desired times (i.e. avails) in which advertisements can be inserted. It is appreciated that advertisements may be considered as a second type of content (i.e., secondary content), as distinguished from the television event, which is considered to be of a first type of content (alternatively, "primary content"). It is appreciated that the terms, "content sub-item" and "interstitial content" may also be used as alternative terms to "secondary content".

The total duration of the television event is typically the sum of the duration of all content item parts P_i and all potential ad breaks A_i (i.e. Duration of [P_1+P_2+P_3+ . . . +P_n+A_1+A_2+A_3+ . . . +A_n−1]) (note that reference numbers are omitted from the above equation).

The content item parts are broadcast associated with a first PID 110, i.e., a regular program PID, hereinafter denoted as PID_content 110. Because the ad breaks are broadcast at the same time (i.e., in parallel) as the beginning of their corresponding P_i, the ad breaks are broadcast associated with a second PID 120, hereinafter denoted by PID_ad 120. Accordingly, ad break A_i is broadcast at the same time (i.e., in parallel) as the beginning of P_(i+1). For example, A_1 161 is broadcast at the same time as P_2 152; A_2 162 is broadcast at the same time as P_3 153; A_n−1 164 is broadcast at the same time as P_n 154, and so forth.

It is appreciated that a timeline indicating a duration is shown in FIG. 1, and is meant to give an indication of the time-dimension of the drawing in the x-direction. Except as otherwise noted below, however, the various blocks (e.g. P_i and A_i) are depicted in FIG. 1 as being substantially the same dimension (i.e. duration) as the other P and A blocks, although in practice, the content represented by the blocks may not necessarily have the same duration. The blocks, and the size of the blocks, are simply intended to serve as a graphical aid to understanding the description herein. By way of example, A_1 161 might be of 30 seconds duration, and A_2 162 might be of 120 seconds duration. Similarly, P_2 152 might be of 28 minutes duration, and P_3 153 might be of 59 minutes duration.

Figure 2:
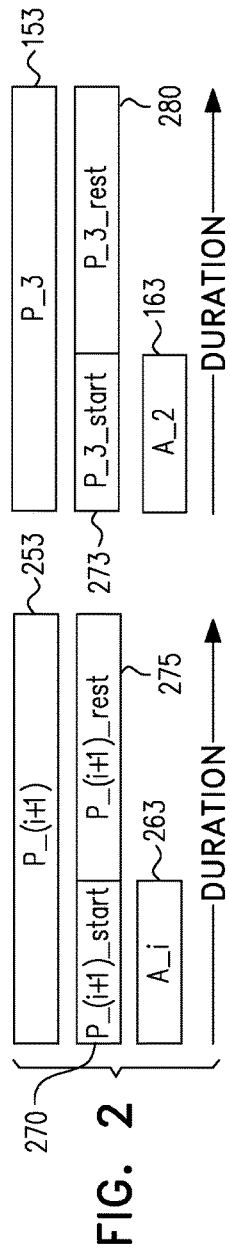
FIG. 2 is a block diagram depicting the relationship between content item part P_(i+1) and content item part A_i of FIG. 1.

Reference is now made to FIG. 2, which is a block diagram depicting the relationship between content item part P_(i+1) 253 and content item part A_i 263 of FIG. 1. Although FIG. 1 does not depict blocks P_(i+1) 253 and A_i 263, nevertheless, it is understood that blocks P_(i+1) 253 and A_i 263 are generalized representations of the various blocks depicted in FIG. 1. A section of P_(i+1) 253 that is broadcast in parallel to A_i 263 is hereinafter denoted as P_(i+1)_start 270, and a remainder of P_(i+1) 253 as P_(i+1)_rest 275. By way of example, and as depicted on the right side of FIG. 2, A_2 163 is broadcast at the same time as P_3 153, and the portion of P_3 153 equal in duration to A_2 163 is accordingly denoted P_3_start 273 and the remainder of P_3 153 is denoted P_3_rest 280.

Both the content item parts P_(i+1) 253 and the secondary content (ad) breaks A_i 263 comprise associated metadata that indicate in an encoded data stream (i.e. the encoded video broadcast stream 100 of FIG. 1) that a particular block of data is content (such as P_3 153) or is an ad break (such as A_2 163) and designate the index (i in the example above) for that block of data. In the case of the content, the metadata further contains a designation of whether the associated content item part is the P_(i+1)_start 270 or the P_i_rest 275 section of a content item part. The metadata resides in entitlement control message (ECM) fields, content adaptation fields, service information (SI) and so forth, as is known in the art. The metadata may reside in several of these options simultaneously. For example, the metadata may reside in both an ECM field and in a content adaptation field, The metadata need not be secret, but it is desirable that the metadata be secure in the sense that modifying the metadata will require intense computational resources.

Figure 3:
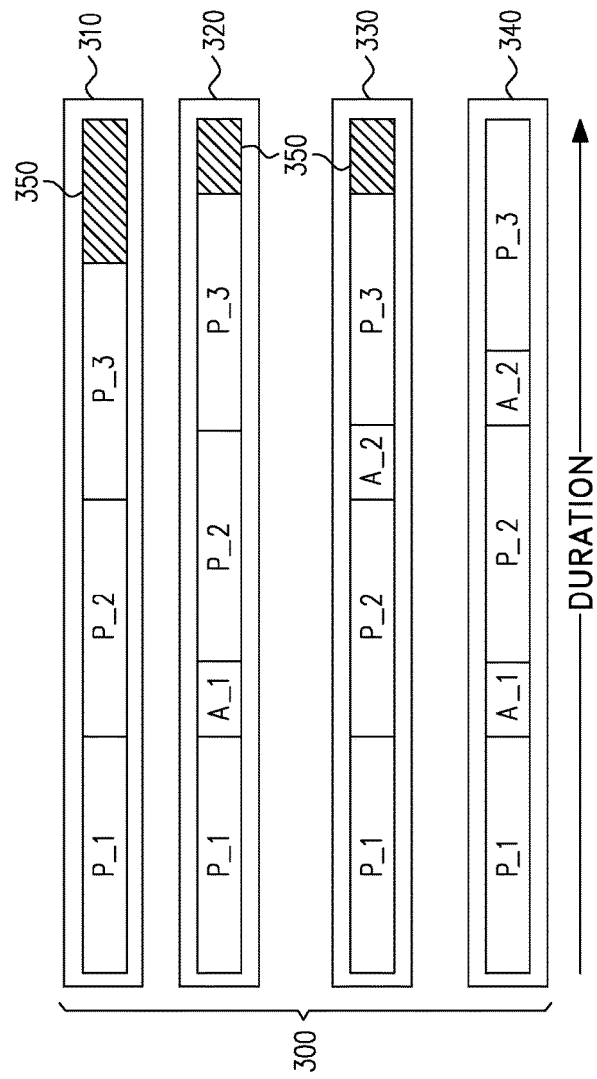
FIG. 3 is a block diagram depicting how different categories of consumer devices might display the streaming broadcast stream of FIG. 1.

Reference is now made to FIG. 3, which is a block diagram depicting how different categories of consumer devices 140 might display the streaming broadcast stream 100 of FIG. 1. For every content item part P_i, there are, in principle, two categories of end devices:

one category of end devices is allowed to play P_(i+1) without playing A_i, this one category of end devices denoted hereinafter as Skip_A_i; and the other category of end devices must play A_i in order to play P_(i+1), this other category of end devices denoted hereinafter as Play_A_i.

For example, FIG. 3 depicts four device populations 300 which might exhibit four different behaviors depending on whether a device plays or skips A_1 and/or A_2. A first device 310, depicted on the top line of FIG. 3, skips both ads A_1 and A_2. Accordingly, the first device 310 is in both of the Skip_A_1 and Skip_A_2 groups. A second device 320, depicted on the second line of FIG. 3, displays ad A_1 and skip ad A_2. The second device 320, accordingly, is in the Play_A_1 group and the Skip_A_2 group. A third device 330, depicted on the third line of FIG. 3, skips ad A_1 and play ad A_2. The third device 330, accordingly, is in the Skip_A_1 group and the Play_A_2 group. A fourth device 340 depicted on the fourth line of FIG. 3, plays both ads A_1 and A_2. Accordingly, the fourth device 340 is in both of the Play_A_1 and Play_A_2 groups. In some embodiments, devices may be assigned to groups by device manufacturers during the manufacturing process. In other embodiments, the division of devices into the groups Skip_A_i and Play_A_i is generally controlled by management messages, as will be explained below in the discussion of FIG. 5.

There is a special content item part 350 called P_extra which is displayed after P_n (in the depiction of FIG. 3, P_3) until the event comprising P_1, P_2, P_3, and any displayed A_1 and A_2 is over. P_extra may comprise static content, such as a simple slide (such as an I-Frame) announcing that the event is over, but, alternatively, P_extra may comprise dynamic content, such as either premium or bonus content pertaining to the event. In principle, P_extra may comprise any appropriate content, including advertisements. P_extra is normally displayed to premium or mid-level subscribers, who did not consume any, or only consumed some of the ads A_1, . . . , A_n−1 and, as a consequence, have unused time left before a new event begins in this video broadcast stream 100 (FIG. 1). In general, after P_n has been played, if the time for the next event has not yet come, then P_extra is played.

Each consumer device 140 (FIG. 1), may hold two or more FIFO (first in first out) buffers, typically stored on a storage medium, such as a magnetic storage disk drive or flash drive. These FIFO buffers will be referred to, respectively, as B_content and B_ad. In the B_content buffer, the content item parts P_i are buffered as necessary, and in the B_ad buffer, the commercials A_i are buffered as necessary.

The consumer device 140 (FIG. 1) records in buffer B_content all content item parts P_i until the content item parts P_i are due to be displayed at which point the played content item part P_i may now be deleted from the buffer. The consumer device 140 also records in buffer B_ad any ad A_i that the device must play i.e., if the device belongs to Play_A_i, then the ad A_i will, accordingly, be buffered.

After P_i has been played from the B_content buffer, there are two options: if the end device belongs to Skip_Ad_i, the device plays P_(i+1) right after P_i. Otherwise, if the device belongs to Play_A_i, the device plays A_i from the B_ad buffer, at which point the advertisement A_i may then be deleted from the buffer.

Typically, after displaying A_i, P_(i+1) is played from the B_content buffer. It is appreciated that ad A_i may, in practice, comprise a series of advertisements which are played together in series, one after the other.

To clarify, P_1, which precedes all ad breaks and is viewed by all end devices at the same time, may be written to buffer B_content and immediately played back. As the operation of writing P_1 to buffer B_content, playing P_1 from buffer B_content, and then optionally deleting P_1 buffer from B_content is redundant, P_1 can, in some embodiments, be played directly from the broadcast stream. Typically, this is true of P_1, but not of any other P_i.

Figure 4:
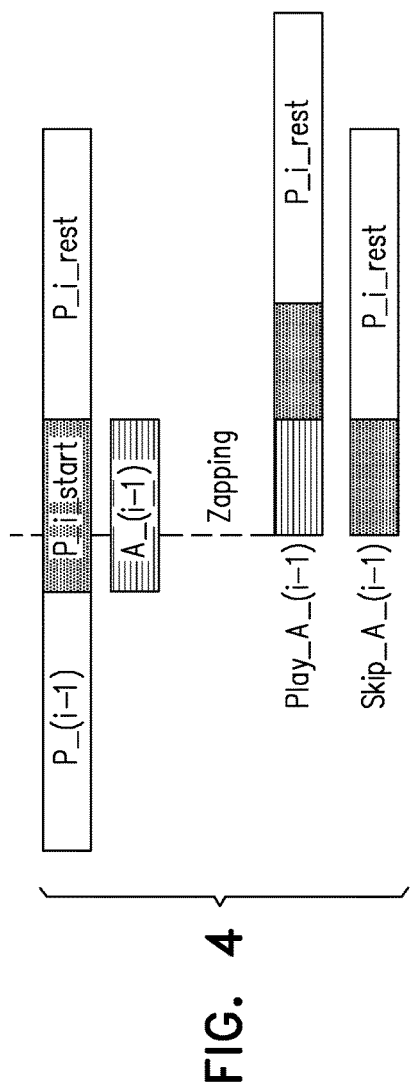
FIG. 4 is a block diagram depicting a state when a viewer changes channels (i.e. "zaps") into a video service during a time when P_i_start is playing in the system of FIG. 1.
Figure 5:
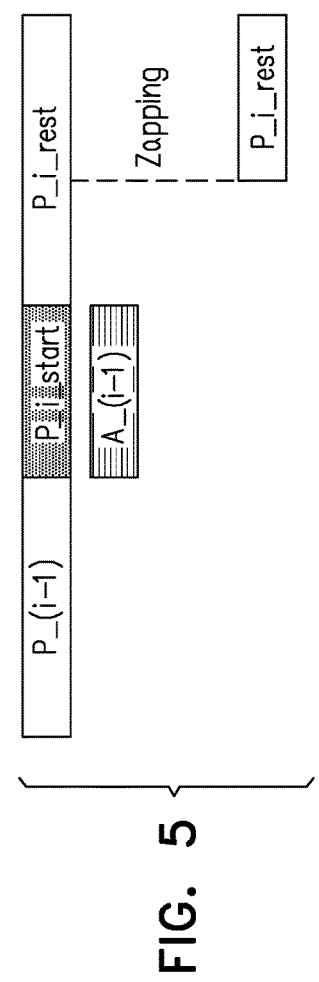
FIG. 5 is a block diagram depicting a state when the viewer zaps into a service during a time when P_i_rest is playing.

Reference is now made to FIGS. 4 and 5. FIG. 4 is a block diagram depicting a state when a viewer changes channels (i.e. "zaps") into a video service during the time when P_i_start is playing. FIG. 5 is a block diagram depicting a state when a viewer zaps into a service during the time when P_i_rest is playing. Turning specifically to FIG. 4, if the consumer device 140 (FIG. 1) belongs to Play_A_(i−1), and the viewer zaps to the video broadcast stream 100 (FIG. 1) when P_i_start is playing, then P_i is recorded to the B_content buffer from the time of zapping, and A_(i−1) is displayed, because the consumer device 140 (FIG. 1) belongs to Play_A_(i−1). Once A_(i−1) is finished, P_i_start is played from the point in the video broadcast stream 100 (FIG. 1) at which the zapping occurred and recording to the buffers began. If, alternatively, the device belongs to Skip_A_(i−1), then P_i is played from the point in the video broadcast stream 100 (FIG. 1) at which the zapping occurred.

Turning now to FIG. 5, if the zapping occurred during the time in which P_i_rest is broadcast, then P_i_rest is displayed for all consumer devices 140 (FIG. 1) from the time of zapping, regardless of whether the consumer devices 140 is a member of Play_A_(i−1) or Skip_A_(i−1), and A_(i−1) is neither recorded nor displayed, because the time for displaying A_(i−1) has past. When P_i_rest finishes, A_i may be inserted if the device is a member of Play_A_i, as described above.

Implementing the embodiments as described enables insertion of a configurable number of advertisements into the video broadcast stream 100 at the consumer device 140. The inserted advertisements may be inserted for differing durations, and by dividing the consumer devices 140 into groups as described with reference to FIG. 2. The inserted advertisements may vary according to subscriber tier levels as well.

The embodiments described herein may be implemented using a security architecture which involves a control word (CW) derivation process out of entitlement control messages (ECMs), and may, for example, and without limiting the generality of the foregoing, be implemented by hardware security tokens such as smart cards.

Three types of ECMs may be utilized to implement the embodiments described herein:

1. ECM_P_i_start are ECMs enabling decryption of P_i_start;
2. ECM_A_(i−1) are ECMs enabling decryption of A_(i−1); and
3. ECM_P_i_rest are ECMs enabling decryption of P_i_rest.

As was noted above in the discussion of FIG. 3, the division of devices into the groups Skip_A_i and Play_A_i is generally controlled by management messages. In some embodiments, devices might be assigned at manufacture to a particular group by the manufacturer. In order to enable the device to decrypt and utilize an ECM which the device has received, the device typically requires an appropriate entitlement management message (EMM), as is known in the art. A device belonging to the Skip_A_i group receives an EMM of type EMM_Skip_A_1. The EMM_Skip_A_1 allows the device to process ECMs of type ECM_P_i_start unconditionally, i.e. without first processing some amount of ECMs of the type ECM_A_(i−1), as will be discussed below. On the other hand, a device belonging to the Play_A_i group receives an EMM of type EMM_Play_A_i. The EMM_Play_A_i enables the device to process ECMs of type ECM_P_i_start only after some amount of ECMs of the type ECM_A_(i−1) have been processed, as will be discussed below.

As is known in the art, each ECM is replaced by a new ECM after a crypto-period. In the present discussion, by way of example, an ECM of type ECM_P_i_start is replaced by a second ECM of type ECM_P_i_start at the end of the current crypto-period. As is known in the art, ECMs are typically processed by the most secure element in the client environment. By way of example, the ECMs may be processed by a smart card or a secure element in the STB itself.

If the consumer device 140 (FIG. 1) belongs to Play_A_(i−1), then the consumer device 140 (FIG. 1) returns the control word for the current ECM_P_i_start, thereby enabling decryption of P_i_start, only if the last X ECMs processed by the device were of the ECM_A_(i−1) type, where X is an operator configurable parameter. By way of example, X may be equal to 3. The ECMs contain designation for their type, i.e.: ECM_A_(i−1); ECM_P_i_start; and ECM_P_i_rest. Therefore, the ECM processor (i.e., smart card or internal STB component) is aware of each of the ECMs' designation. The ECM processor is also aware of its own status (i.e., belonging to Skip_A_(i−1) or not). Therefore, the ECM processor manages internal counters in its memory, and determines whether it can provide the CW for ECM_P_i_start immediately, or must process X ECMs of type ECM_A_(i−1) beforehand.

As was mentioned above with reference to FIG. 4, a consumer device 140 (FIG. 1) which zaps into the middle to the P_i_start period, will, perforce, have no alternative but to first play X crypto-periods of ads having ECMs of type ECM_A_(i−1). Only then is the consumer device 140 be able to process the ECM_P_i_start type ECM to produce a control word to decrypt and play P_i_start. As such, even a hacked or rogue consumer device 140 (i.e. a consumer device which has been illegally tampered with in order to circumvent the consumer device's programming) cannot descramble P_i_start without first breaking for the duration of A_(i−1) and processing A_(i−1)'s associated ECM_A_(i−1)s.

If, on the other hand, the consumer device 140 (FIG. 1) belongs to Skip_A_(i−1), the consumer device 140 (FIG. 1) returns the control word for ECM_P_i_start without additional conditions.

The ECMs of type ECM_P_i_rest always produce control words for all subscribers to the service. This is the case even when the consumer device 140 (FIG. 1) is associated with a particular service tier specifying a minimum number of ad breaks to insert. Accordingly, zapping into the video broadcast stream 100 (FIG. 1) during the period when ECMs of type ECM_P_i_rest are in use enables the scenario described above in FIG. 5.

Figure 6:
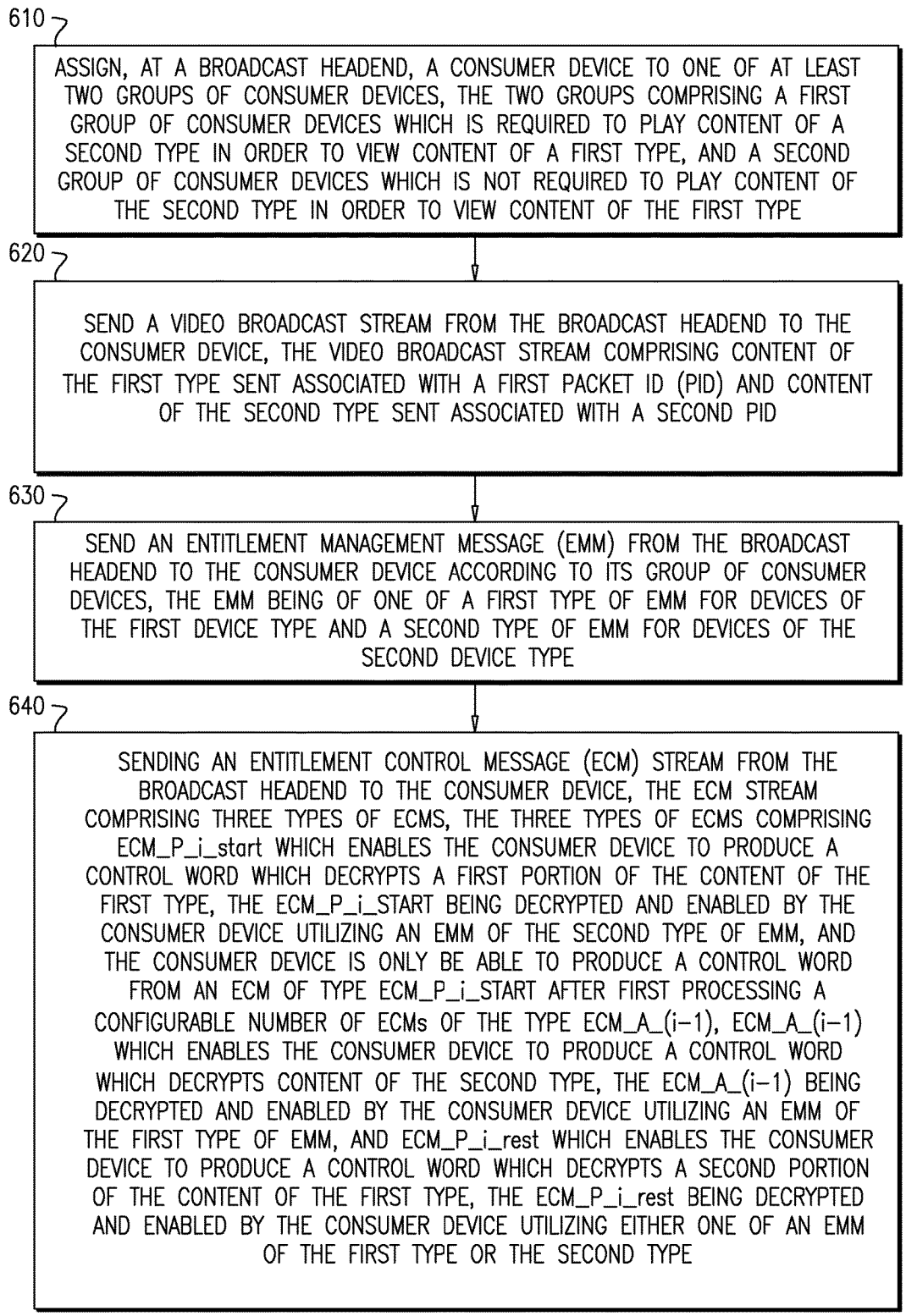
FIG. 6 is a flowchart diagram depicting a method of implementing an embodiment described herein.

Reference is now made to FIG. 6, which is a flowchart diagram depicting a method of implementing an embodiment described herein. It is appreciated that the embodiment described in FIG. 6 is directed to the broadcast headend. It is noted in the following description of FIG. 6 where the corresponding method is implemented in the consumer device 140 (FIG. 1), and changed, accordingly.

In step 610, at the broadcast headend 130 (FIG. 1) the consumer devices 140 (FIG. 1) are assigned to one of at least two groups of consumer devices 140 (FIG. 1), the two groups comprising a first group of consumer devices 140 (FIG. 1) which is required to play content of a second type in order to view content of a first type, or a second group of consumer devices 140 (FIG. 1) which is not required to play content of a the second type in order to view content of a the first type. It is appreciated that in a corresponding embodiment at the consumer device 140 (FIG. 1) the consumer device itself is assigned by the broadcast headend 130 (FIG. 1) to one of at least two groups of consumer devices.

In step 620, a video broadcast stream is sent from the broadcast headend 130 (FIG. 1) to the consumer device 140 (FIG. 1) (or, in an alternative embodiment, is received at the consumer device 140 (FIG. 1) from the broadcast headend 130 (FIG. 1)), the video broadcast stream comprising content of the first type sent associated with a first packet ID (PID) and content of the second type sent associated with a second PID.

In step 630, an EMM is sent from the broadcast headend to the consumer device according to its group of consumer devices, the EMM being of one of a first type of EMM for devices of the first device type and a second type of EMM for devices of the second device type. In an alternative embodiment, the EMM is received at the consumer device 140 (FIG. 1) from the broadcast headend 130 (FIG. 1).

In step 640, an ECM stream is sent an entitlement control message (ECM) stream is sent from the broadcast headend 130 (FIG. 1) to the consumer device 140 (FIG. 1) (or, in an alternative embodiment, is received at the consumer device 140 (FIG. 1) from the broadcast headend 130 (FIG. 1)) to the consumer device 140 (FIG. 1), the ECM stream comprising three types of ECMs. The three types of ECMs comprising:

ECM_P_i_start ECMs, which enable the consumer device to produce a control word which decrypts a first portion of the content of the first type, the ECM_P_i_start ECM being decrypted and enabled by the consumer device utilizing an EMM of the second type of EMM, and the consumer device is only be able to produce a control word from an ECM of type ECM_P_i_start after first processing a configurable number of ECMs of the type ECM_A_(i−1);

ECM_A_(i−1) ECMs, which enable the consumer device to produce a control word which decrypts content of the second type, the ECM_A_(i−1) being decrypted and enabled by the consumer device utilizing an EMM of the first type of EMM; and ECM_P_i_rest ECMs, which enable the consumer device to produce a control word which decrypts a second portion of the content of the first type, the ECM_P_i_rest being decrypted and enabled by the consumer device utilizing either one of an EMM of the first type or the second type.

If the consumer device 140 (FIG. 1) is assigned to the first group of consumer devices, then the consumer device 140 (FIG. 1) is only be able to produce a control word from an ECM of type ECM_P_i_start, after first processing a configurable number of ECMs of the type ECM_A_(i−1). If the consumer device 140 (FIG. 1) is assigned to the second group of consumer devices, then the consumer device 140 (FIG. 1) is able to unconditionally produce a control word from an ECM of type ECM_P_i_start.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
assigning, at a broadcast headend, a consumer device to one of at least two groups of consumer devices, the two groups comprising:
a first group of consumer devices which is required to play content of a second type in order to view content of a first type; and
a second group of consumer devices which is not required to play content of the second type in order to view content of the first type;
sending a video broadcast stream from the broadcast headend to the consumer device, the video broadcast stream comprising content of the first type sent associated with a first packet ID (PID) and content of the second type sent associated with a second PID, wherein the first PID and the second PID are processed at the consumer device at the same time;
sending an entitlement management message (EMM) from the broadcast headend to the consumer device according to its group of consumer devices, the EMM being of one of a first type of EMM for devices of the first device type and a second type of EMM for devices of the second device type;
sending an entitlement control message (ECM) stream from the broadcast headend to the consumer device, the ECM stream comprising three types of ECMs, the three types of ECMs comprising:
ECM_A_(i−1) which enables the consumer device to produce a control word which decrypts content of the second type, the ECM_A_(i−1) being decrypted and enabled by the consumer device utilizing an EMM of the first type of EMM;
ECM_P_i_start which enables the consumer device to produce a control word which decrypts a first portion of the content of the first type, the ECM_P_i_start being decrypted and enabled by the consumer device utilizing an EMM of the second type of EMM, and the consumer device is only be able to produce a control word from an ECM of type ECM_P_i_start after first processing a configurable number of ECMs of the type ECM_A_(i−1); and
ECM_P_i_rest which enables the consumer device to produce a control word which decrypts a second portion of the content of the first type, the ECM_P_i_rest being decrypted and enabled by the consumer device utilizing either one of an EMM of the first type or the second type.

2. The method according to claim 1 wherein the content of the second type comprises at least one advertisement.

3. The method according to claim 2 wherein the content of the second type comprises more than one advertisement.

4. The method according to claim 1 wherein the content of the first type comprises multiple content items of the first type, and the content of the second type comprises multiple content items of the second type.

5. The method according to claim 1 wherein after devices of the second group display a final part of the second portion of the content of the first type, the devices of the second group display static content until devices of the first group display the final part of the second portion of the content of the first type.

6. The method according to claim 5 wherein the static content comprises an I-frame.

7. The method according to claim 1 wherein after devices of the second group display a final part of the second portion of the content of the first type, the devices of the second group display dynamic content until devices of the first group display the final part of the second portion of the content of the first type.

8. The method according to claim 7 wherein the dynamic content comprises content pertaining to the content of the first type.

9. The method according to claim 1 wherein the content of the first type comprises metadata designating it as requiring either one of:
   an ECM of type ECM_P_i_start in order to be decrypted; or
   an ECM of type ECM_P_i_rest in order to be decrypted.

10. The method according to claim 1 wherein content of the second type comprises metadata designating it as requiring an ECM of the type ECM_A_(i−1) in order to be decrypted.

11. A method comprising:
   a consumer device assigned by a broadcast headend to one of at least two groups of consumer devices, the two groups comprising:
      a first group of consumer devices which is required to play content of a second type in order to view content of a first type; and
      a second group of consumer devices which is not required to play content of the second type in order to view content of the first type;
   receiving a video broadcast stream from the broadcast headend at the consumer device, the video broadcast stream comprising content of the first type sent associated with a first packet ID (PID) and content of the second type sent associated with a second PID, wherein the first PID and the second PID are processed at the consumer device at the same time;
   receiving an entitlement management message (EMM) from the broadcast headend according to the assigned group of consumer devices, the EMM being of one of a first type of EMM for devices of the first device type and a second type of EMM for devices of the second device type;
   receiving an entitlement control message (ECM) stream at the consumer device from the broadcast headend, the ECM stream comprising three types of ECMs, the three types of ECMs comprising:
      ECM_A_(i−1) which enables the consumer device to produce a control word which decrypts content of the second type, the ECM_A_(i−1) being decrypted and enabled by the consumer device utilizing an EMM of the first type of EMM;
      ECM_P_i_start which enables the consumer device to produce a control word which decrypts a first portion of the content of the first type, the ECM_P_i_start being decrypted and enabled by the consumer device utilizing an EMM of the second type of EMM, and the consumer device is only be able to produce a control word from an ECM of type ECM_P_i_start after first processing a configurable number of ECMs of the type ECM_A_(i−1); and
      ECM_P_i_rest which enables the consumer device to produce a control word which decrypts a second portion of the content of the first type, the ECM_P_i_rest being decrypted and enabled by the consumer device utilizing either one of an EMM of the first type or the second type.

12. The method according to claim 11 wherein the content of the second type comprises at least one advertisement.

13. The method according to claim 12 wherein the content of the second type comprises more than one advertisement.

14. The method according to claim 11 wherein after devices of the second group display a final part of the second portion of the content of the first type, the devices of the second group display static content until devices of the first group display the final part of the second portion of the content of the first type.

15. The method according to claim 14 wherein the static content comprises an I-frame.

16. The method according to claim 11 wherein after devices of the second group display a final part of the second portion of the content of the first type, the devices of the second group display dynamic content until devices of the first group display the final part of the second portion of the content of the first type.

17. The method according to claim 16 wherein the dynamic content comprises content pertaining to the content of the first type.

18. The method according to claim 1 wherein the content of the first type comprises multiple content items of the first type, and the content of the second type comprises multiple content items of the second type.

19. The method according to claim 11 wherein the content of the first type comprises metadata designating it as requiring either one of:
   an ECM of type ECM_P_i_start in order to be decrypted; or
   an ECM of type ECM_P_i_rest in order to be decrypted.

20. The method according to claim 11 wherein content of the second type comprises metadata designating it as requiring an ECM of the type ECM_A_(i−1) in order to be decrypted.

* * * * *

UNITED STATES PATENT AND TRADEMARK OFFICE
CERTIFICATE OF CORRECTION

| | |
|---|---|
| PATENT NO. | : 9,788,033 B1 |
| APPLICATION NO. | : 15/196068 |
| DATED | : October 10, 2017 |
| INVENTOR(S) | : Harel Cain et al. |

It is certified that error appears in the above-identified patent and that said Letters Patent is hereby corrected as shown below:

Column 3, Lines 43-44, "field, The" to read as --field. The--.

Column 6, Line 58, "a the" to read as --a--.

Column 6, Line 58, "a the" to read as --a--.

Column 10, Line 37 approx., Claim 18, "1" to read as --11--.

Signed and Sealed this
Twenty-first Day of November, 2017

Joseph Matal
*Performing the Functions and Duties of the
Under Secretary of Commerce for Intellectual Property and
Director of the United States Patent and Trademark Office*